United States Patent [19]

Abeel et al.

[11] 3,803,762
[45] Apr. 16, 1974

[54] FLEXIBLE GLASS BODY ASSEMBLIES

[75] Inventors: Joseph A. Abeel; Charles L. Schreiber, both of Corning, N.Y.

[73] Assignee: Corning Glass Works, Corning, N.Y.

[22] Filed: May 23, 1966

[21] Appl. No.: 552,152

Related U.S. Application Data

[63] Continuation-in-part of Ser. No. 388,350, Aug. 5, 1964, abandoned, which is a continuation-in-part of Ser. No. 199,118, May 31, 1962, abandoned.

[52] U.S. Cl............................ 49/34, 49/40, 49/227, 49/502
[51] Int. Cl................................................. B60j 1/16
[58] Field of Search............ 160/37, 363, 351, 352, 160/121; 49/502, 40, 34, 227; 65/30, 111

[56] References Cited
UNITED STATES PATENTS

| | | | |
|---|---|---|---|
| 1,553,735 | 9/1925 | Wolff | 49/34 |
| 2,235,454 | 3/1941 | Korspchak | 160/37 |
| 2,258,972 | 10/1941 | Carlson | 160/363 X |
| 2,361,762 | 10/1944 | Glenn et al. | 160/121 X |
| 2,392,715 | 1/1946 | Zitrin | 160/179 X |
| 2,732,298 | 1/1956 | Stookey | 65/30 X |
| 2,779,136 | 1/1957 | Hood et al. | 65/30 UX |
| 3,001,880 | 9/1961 | Ruskin | 106/50 |
| 3,214,213 | 10/1965 | Hezler, et al. | 160/23 X |

*Primary Examiner*—Mervin Stein
*Assistant Examiner*—Philip C. Kannan
*Attorney, Agent, or Firm*—Walter S. Zebrowski

[57] ABSTRACT

A flexible glass body assembly embodying a flexible sheet of strengthened glass and glass sheet bending means. The flexible sheet of strengthened glass has a predetermined unstressed shape and sufficient elasticity to assume at least in part in cooperation with the sheet bending means predetermined configurations in various positions of the sheet. The bending means embody sheet edge portion engaging members disposed along at least one edge of the sheet.

12 Claims, 11 Drawing Figures

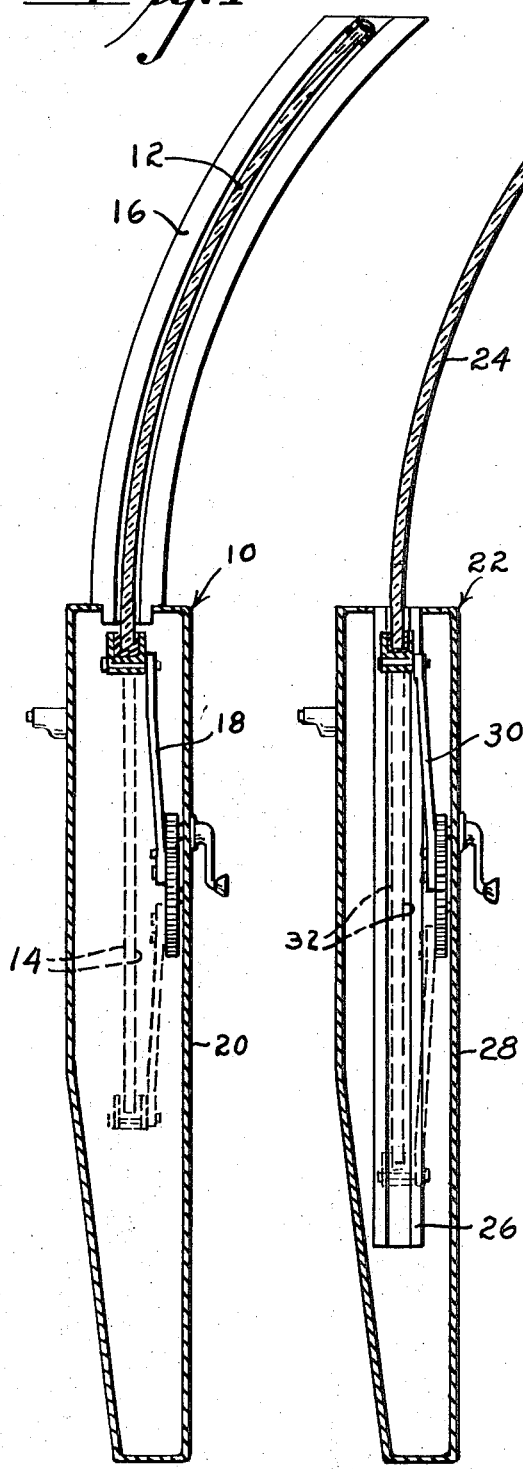
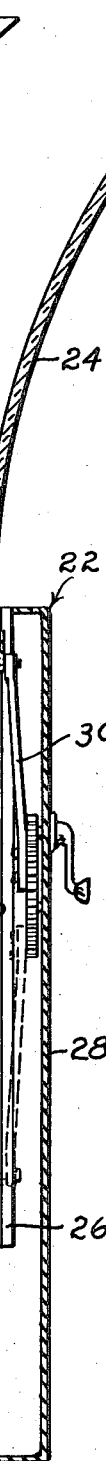
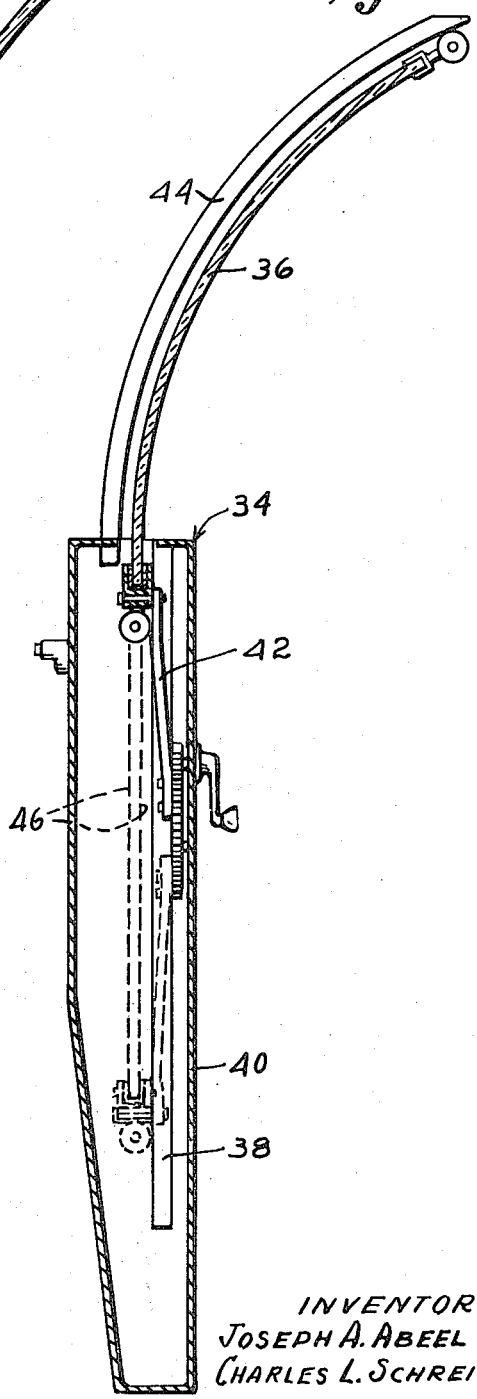

3,803,762
SHEET 2 OF 2
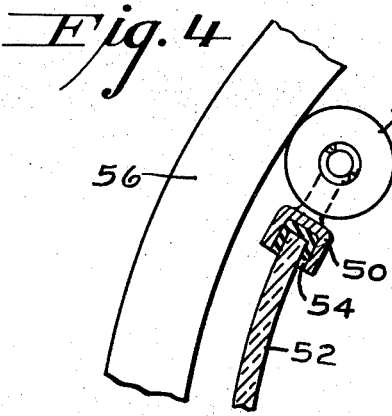
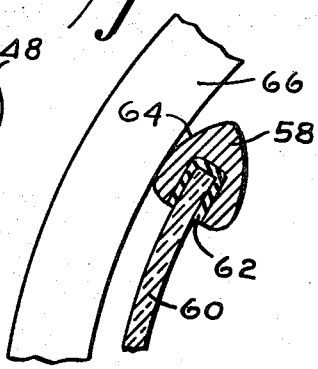
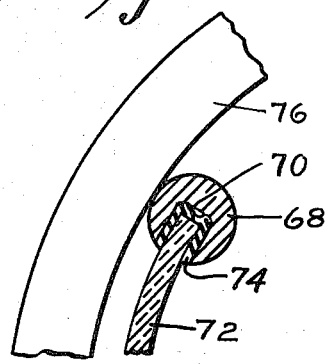
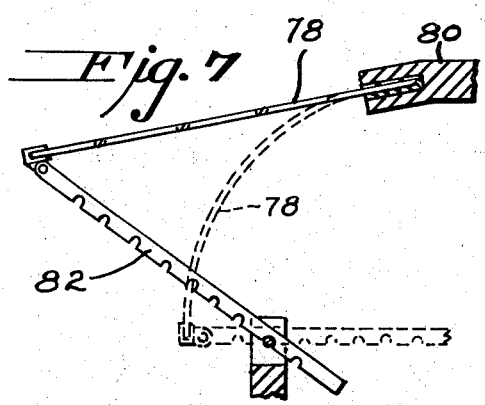
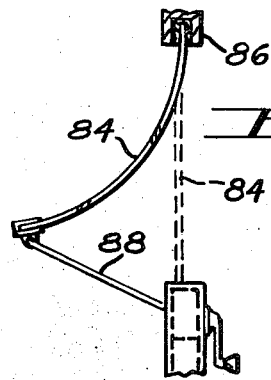
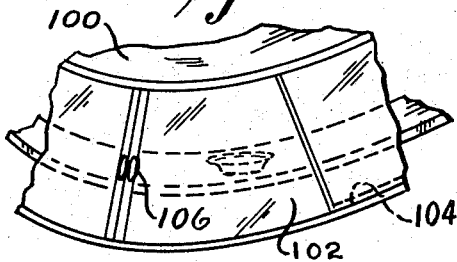
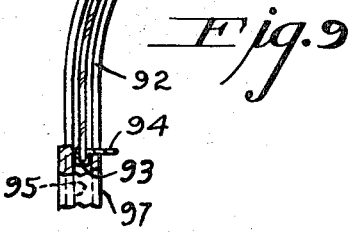
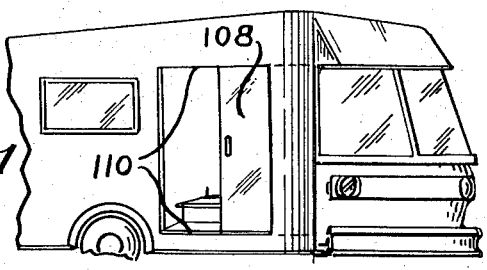
INVENTORS
JOSEPH A. ABEEL AND
CHARLES L. SCHREIBER
BY Walter S. Zebrowski
ATTORNEY

3,803,762

FLEXIBLE GLASS BODY ASSEMBLIES

CROSS REFERENCE TO RELATED APPLICATIONS

This application is a continuation-in-part of application Ser. No. 388,350, filed Aug. 5, 1964, which was a continuation-in-part of application Ser. No. 199,118, filed May 31, 1962, now both abandoned.

BACKGROUND OF THE INVENTION

This invention relates to flexible glass body assemblies and more particularly to flexible glass doors and windows but is in no way limited to such applications.

In the past, automobile side windows, for example, have been curved in an effort to allow better visibility, provide ease of entering and leaving a vehicle, and to improve styling. Such windows, generally having a thickness of about 3/16 inch or more, would be formed to a desired curvature, tempered and thereafter employed in a curved window track.

Glass bending, however, is not a precise art, and it has been found difficult to obtain a good fit within a track due to variations in the glass curvature. To overcome these variations, the window tracks were made having ample clearance for the glass edges. This would result in some windows having a particularly loose fit in the track causing rattles and leading to glass breakage or to the glass jarring loose from its support mechanism. If said clearance was made less, it was found that some windows would not fit at all or would bind and thereafter break in service.

In addition to the problem of fitting the windows in the tracks, the automobile doors or walls would have to be made excessively thick to allow sufficient space for storing the curved window in the lowered position. A thickness of about 6 inches or more was found necessary, which thickness resulted in loss of interior space and put severe limitations on door designs and automobile styling.

Door assemblies for an omnibus, for example, have been formed of framed, flat glass sheets, embodying four hinged sections. Such doors would fold in the entrance stepwell of the omnibus requiring a stepwell wide enough to accomodate such folded doors while providing sufficient room for passenger passage.

It is clearly evident that the term "glass" is used herein as it is commonly understood and defined in the art. Therefore, by the term "glass" is meant an inorganic product of fusion which has cooled to a rigid condition without crystallizing. "Glass Glossary," compiled by the Committee on Classification, Nomenclature, and Glossary, *The American Ceramic Society Bulletin*, 27(9)353-62 (1948).

BRIEF SUMMARY OF THE INVENTION

The objects of the present invention are to provide a glass body assembly particularly suitable for vehicle doors and windows which provides an excellent fit for the glass member without permitting rattling, breakage, or jarring loose thereof, which glass member is highly transparent, scratch resistant, and capable of being moved from an open or retracted position in which said member has a predetermined configuration, to a closed position in which it has another configuration, with a minimum of storing space being required in the retracted position.

The objects of this invention are achieved by forming a glass body assembly comprising a flexible strengthened sheet of glass having a predetermined unstressed shape and sufficient elasticity to assume either alone or in cooperation with sheet bending means, embodied within the assembly, configurations required in various positions of said sheet, the bending means embodying sheet edge portion engaging members disposed along at least one edge portion of the sheet.

Additional objects, features and advantages of the present invention will become apparent to those skilled in the art from the following detailed description and the attached drawings.

BRIEF DESCRIPTION OF THE DRAWING

FIG. 1 is a cross sectional elevation of an automobile door and window assembly wherein said window is substantially flat in its unstressed condition.

FIG. 2 is a cross sectional elevation of an automobile door and window assembly wherein said window is prebent to a desired curve in its unstressed condition.

FIG. 3 is a cross sectional elevation of an automobile door and window assembly wherein said window is prebent to an intermediate curve in its unstressed condition.

FIG. 4 is a cross sectional elevation of an automobile window leading edge assembly.

FIG. 5 is a cross sectional elevation of another automobile window leading edge assembly.

FIG. 6 is a cross sectional elevation of still another automobile window leading edge assembly.

FIG. 7 is a cross sectional elevation of a rigidly mounted flexible window and bending means therefor.

FIG. 8 is a cross sectional elevation of another embodiment of a rigidly mounted flexible window and bending means therefor.

FIG. 9 is a cross sectional elevation of a curved window assembly.

FIG. 10 is a fragmentary oblique view of a curved glass enclosed display case.

FIG. 11 is a fragmentary oblique view of an omnibus illustrating a door formed in accordance with this invention.

DETAILED DESCRIPTION OF THE INVENTION

The only physical property which must be inherent in glasses operable in this invention is flexibility or resilience. It is immediately apparent that this property would be obtained if the glass sheeting utilized exhibited higher strength than that commonly occuring in conventional glass sheeting, since higher forces may be applied to strengthened glass than may be applied to unstrengthened glass, thereby resulting in greater deformation. This invention is particularly directed to the use of glasses possessing such high strengths.

The strengthening of glass articles by producing in a surface layer a substantially uniform compressive stress is very well-known in the glassmaking art. Three principal methods have been employed, such as for example, the physical application of a casing, thermal tempering, and ion exchange.

"Casing" glass contemplates covering an initial gather of one type of glass with a gather of a second glass having a lower coefficient of thermal expansion than the first and then shaping the composite gather to the desired configuration. As the composite article cools, the inner glass having the higher coefficient of thermal expansion tends to contract more than the surface glass, thereby producing a permanent compressional stress in the outside glass layer. The use of this method in the manufacture of glass sheeting has been relatively limited because of the difficulties in producing a uniform casing.

Thermal tempering, employed extensively in the sheet glass industry, comprises heating the glass close to its softening point and then quickly chilling it to a temperature below the glass strain point to develop a surface layer of compressive stress.

The ion exchange method for strengthening glass articles contemplates exposing a glass surface to a source of ions which, at elevated temperatures, will exchange with an ion present in the glass. This results in the development of a surface layer having a composition differing from that of the parent glass. There are two broad categories of ion exchange methods, for example, ion exchange effected at a temperature above the strain point of the glass and ion exchange conducted below the strain point of the glass.

In the first method, the glass article is contacted with a source of ions at a temperature above the strain point of the glass. These ions are so chosen that they will replace certain ions in the surface of the parent glass and produce a surface layer, which is sometimes crystalline, having a coefficient of thermal expansion lower than that of the parent glass. This method, then, enables the development of a "casing" on a glass in situ.

In the second method, a glass article containing alkali metal ions of relatively small ionic radius is contacted with a source of monovalent ions having a relatively large ionic radius at an elevated temperature but below the strain point of the glass. A layer of compressive stress is induced in the glass surface by the glass volume tending to increase as the ion replacement is effected in the glass structure, and by this, tendency being inhibited due to the glass temperature being too low to permit normal viscous flow of the glass at a rate sufficiently rapid to release the stresses induced.

Although strengthened glass sheeting operable in this invention can be produced by any of the three general methods discussed above and, therefore, the sheeting can be of essentially any glass composition, we have found that glass sheeting strengthened through low temperature ion exchange provides the best combination of flexibility and high strength. The co-pending applications of Ellen C. Mochel, application Ser. No. 181,887 filed Mar. 23, 1962 and Harmon M. Garfinkel, application Ser. No. 443,651 filed Mar. 29, 1965, said Garfinkel application being a continuation-in-part of application Ser. No. 181,886 filed Mar. 23, 1962 now abandoned, set forth a discussion of the process variables involved in low temperature ion exchange strengthening and recite glass compositions which can be strengthened many fold over the original values of the parent glass. The glasses reported in those applications are alkali metal silicate glasses containing at least 5.0 percent by weight $Al_2O_3$ or $ZrO_2$. Examples of the types of glass which may be strengthened by said ion exchange process, as taught by said Mochel and Garfinkel applications, are lithium silicate glass including lithia-alumina-silica glass, lithia-zirconia-silica glass, lithia-titania-silica glass, and lithium borosilicate glass; alkali aluminosilicate glass including soda aluminosilicate glass; alkali-zirconia-silica glass including soda-zirconia-silica glass; alkali metal oxide glass, and the like. Since the glasses recited in said Mochel and Garfinkel applications are preferred for our invention, the disclosures of those applications are incorporated by reference into this specification.

In reference to automobile side windows, the term raised position as used herein means closed position, and the term lowered position means open position. By the term stressed is meant the condition of a glass body which is subjected to a bending, flexing, or deforming force from outside means.

FIG. 1 illustrates an automobile door and window assembly 10, wherein window pane 12 is flat in its normal unstressed condition illustrated by dotted lines 14, and consists of a thin strengthened flexible glass sheet. Window tracks 16 disposed at opposite sides of said pane, engage the pane edge portions as pane 12 is raised by pane raising and lowering mechanism 18, and form a curved path for the pane, which path is oblique to the pane edges. As pane 12 is raised, tracks 16 confine the pane edges causing the pane to follow the curved path thereby bending the pane to form a curved window. In this embodiment, the pane is stressed and curved in its raised position and unstressed and flat in its lowered position. Automobile door 20 may be formed having a thickness no greater than that required to store the flat pane 12 and the raising and lowering mechanism 18.

FIG. 2 illustrates an automobile door and window assembly 22, wherein window pane 24, consisting of a thin strengthened flexible glass sheet, is prebent to a desired curve and therefore unstressed in its raised and curved position. In this embodiment window tracks 26 are disposed within the door 28 to engage pane 24 in the same manner as tracks 16 described in connection with FIG. 1 above, except that tracks 26 form a straight path for said pane. As the prebent pane 24 is lowered by raising and lowering mechanism 30, tracks 26 confine the pane edges causing the pane to follow the straight path formed by them and assume a flat shape illustrated by dotted lines 32. The window assembly of this embodiment affords greater safety by having pane 24 unstressed while curved in its raised position and stressed in its lowered position. It also enables forming of windows for the well known "hardtop" type automobiles which do not have a rigid supporting member between the front and rear side windows for mounting a window track.

FIG. 3 illustrates an automobile door and window assembly 34 wherein window pane 36, consisting of a thin strengthened flexible glass sheet, is prebent to a curve intermediate the ultimate curve of the curved window and a flat shape. Such a prebent window is termed partially prebent. Window tracks 38, disposed at opposite sides of said pane within door 40, engage the pane edge portions as pane 36 is lowered by pane raising and lowering mechanism 42 and form a straight path for said pane, which straight path is oblique to the pane edges. Window tracks 44, disposed at opposite sides of said pane on the exterior of door 40, engage the pane edge portions as pane 36 is raised by mechanism 42 and form a curved path for said pane, which curved path is also oblique to the pane edges. Therefore, as pane 36 is raised, tracks 44 confine the pane edges causing the pane to follow said curved path thereby bending the pane to form a curved window, and as pane 36 is lowered, tracks 38 confine the pane edges causing the pane to follow a straight path and assume a flat shape illustrated by dotted lines 46. In this embodiment, the pane is stressed in both the raised and lowered positions, however, to a lesser degree than either the flat or fully prebent panes, illustrated in FIGS. 1 and 2, when they are in a stressed condition.

The window tracks may be either suitably grooved and shaped channels or shaped bars, which are lubricated or cushioned to allow the glass pane to be lowered or raised smoothly and to prevent the pane from gouging or digging into and wearing away said tracks. In addition, however, the leading edge of the glass may be provided with means to facilitate smooth window movement along the tracks. FIG. 4 illustrates a suitable window leading edge assembly, comprising a roller 48 and roller mounting 50, fixedly mounted to the leading edge of pane 52 and cushioned therefrom by means of resilient cushioning gasket 54. As pane 52 is raised and lowered, roller 48 rolls along window track 56. One such leading edge assembly is mounted at each leading edge corner area of said pane.

FIG. 5 illustrates another type of window leading edge means. A U-shaped member 58 is fixedly mounted to the leading edge of pane 60 and cushioned therefrom by means of resilient cushioning gasket 62. Surface 64 of member 58 has a convex curvature the radius of which is less than the radius of the curvatures of track 66 or the bending radius of pane 60. This allows member 58 to slide along track 66 solely on surface 64, thereby avoiding digging into or gouging said track.

FIG. 6 illustrates still another type of leading edge means. A cylindrical member 68, having a substantially circular cross section and a longitudinal U-shaped groove 70 formed therein, is fixedly mounted to the leading edge of pane 72 and cushioned therefrom by means of resilient cushioning gasket 74. Member 68 can smoothly slide along track 76 since it has no edges or corners to dig into or gouge said track.

FIG. 7 illustrates a rigidly mounted flexible glass body assembly comprising flexible strengthened glass sheet 78, mounting structure 80 and sheet bending means 82. Sheet 78 may be prebent, partially prebent, or flat, and thereafter rigidly mounted to structure 80 along one edge by suitable means not shown. Means 82 may be disposed along opposite sides of sheet 78 adjacent said one edge, or along the side opposite said one edge. Sheet 78 may then be caused to bend about said one edge by means 82. It is clear that in this embodiment, the sides of sheet 78 are not restrained by guides or tracks. The embodiment illustrated is suitable as a trailer window or the like.

FIG. 8 illustrates another embodiment of a rigidly mounted flexible glass body assembly comprising flexible strengthened glass sheet 84, mounting structure 86, and sheet bending means 88. Sheet 84 may be prebent, partially prebent, or flat, and thereafter rigidly mounted to structure 86 along one edge by suitable means not shown. Means 88 may be disposed along opposite sides of sheet 84 adjacent said one edge, or along the side opposite said one edge. Sheet 84 may then be caused to bend about said one edge by means 88. It is clear that in this embodiment, the sides of sheet 84 are not restrained by guides or tracks. This embodiment is also suitable as a trailer window or the like.

FIG. 9 illustrates flexible glass body assembly suitable as an omnibus side window, a station wagon type vehicle rear window or the like, wherein a window pane 90, consists of a flexible strengthened glass sheet which is either prebent, partially prebent or flat. Window tracks 92, disposed at opposite sides of said pane, engage the pane edge portions of pane 90 in the lowered position and form a desired path for said pane, which path may be oblique to the pane edges. When pane 90 is in the closed position, member 93 in conjunction with handle 94 cause pane 90 to be sealed at the lower edge thereof by fitting member 93 into a suitable recess 95 within structure 97 while the extended portion of handle 94 abuts the shoulder of structure 97 adjacent said recess. As pane 90 is raised by suitable means, such as handle 94, the pane edges are engaged by window tracks 96 disposed within the roof portion 98 of the vehicle. Window tracks 96 may be formed to conform generally with the contour of said roof portion and form a path for said pane which is oblique to the pane edges. As pane 90 is raised, tracks 96 confine the pane edges causing the pane to follow the curved path, thereby bending said pane to substantially conform to the contour of said roof portion. As is readily seen, the embodiment of FIG. 9 may be formed without tracks 92 thus causing pane 90 to be unrestrained in the extended position as illustrated by pane 24 of FIG. 2 and panes 78 and 84 of FIGS. 7 and 8 respectively. In such an embodiment, pane 90 is closed by causing member 93 to engage recess 95 by means of handle 94 thereby restraining pane 90 in a position conforming to the opening when the pane is partially prebent, that is preformed to a degree of curvature other than said opening and tracks 92, as heretofore described. Member 93, handle 94, and structure 97 may comprise a means for latching pane 90 in the closed position.

FIG. 10 illustrates a glass enclosed display case 100, wherein the sliding door 102 thereof, consists of a flexible strengthened glass sheet which is either prebent, partially prebent or flat. Door tracks 104, disposed at opposite sides of said door, engage the door edge portions of said door 102, and form a path for said door which is oblique to the door edges. As door 102 is slid open or closed by means such as handle 106, door tracks 104 confine the door edges causing the door to follow the curved path of tracks 104, thereby bending said door to substantially conform to the contour of said display case 100. This embodiment illustrates that only the upper and lower edges of said door need be substantially parallel, while the remaining edges may be formed to conform to the shape of the case. In addition, this embodiment illustrates that a flexible strengthened glass body may be employed in sloped position, thereby forming a curve of parallel lines which lines are parallel to said parallel edges of the glass body.

FIG. 11 illustrates an omnibus door assembly wherein the sliding door 108 consists of a flexible strengthened glass sheet. Door tracks 110, disposed at opposite sides of said door, engage the door edge portions of said door 108 and form a path for said door which is oblique to the door edges. As door 108 is opened and closed by suitable means not shown, door tracks 110 confine the door edges causing the door to follow the curved path of tracks 110, thereby bending said door to conform to the curve of said tracks.

A typical example of carrying out the present invention is illustrated by the following. An automobile side window assembly may be prepared by prebending a pane of glass, having a size of about 18 by 24 inches and a thickness of 0.050 inch, to a curvature having a radius of 30 inches and, thereafter, ion-exchange strengthening the glass by the methods described in the heretofore noted Mochel and Garfinkel applications. A roller assembly comprising a roller and roller mounting is affixed to each corner area of the lower edge of said pane. Two substantially oppositely disposed pane edge portion engaging members consisting essentially of straight bars, each member having one smooth pane engaging surface, are mounted within an automobile door having a window raising and lowering mechanism, and are spaced from one another to allow said rollers to engage said engaging surface. In the raised position, the pane assumes its prebent curved shape and is unstressed. In the lowered position, the pane is caused to bend to a substantially flat shape.

It has been found that the glass pane of an automobile window assembly, such as that described in the typical example, is highly transparent, scratch resistant, and can be repeatedly flexed or bent without failure. It is also snugly held and does not rattle or jar loose. The door embodying such window assembly may be less than one half of the thickness required for a conventional rigidly prebent pane and is substantially lighter in weight as a result of having less material in the door and window.

It can be readily seen that other glass bodies such as automobile sun visors, garage doors, building windows and the like can be formed in accordance with this invention.

Although the present invention has been described with respect to specific details of certain embodiments thereof, it is not intended that such details be limitations upon the scope of the invention except insofar as set forth in the following claims.

We claim:

1. A flexible glass body assembly comprising glass sheet bending means embodied within said assembly and a flexible sheet of strengthened glass having a predetermined unstressed shape and sufficient elasticity to assume at least in part in cooperation with said sheet bending means predetermined configurations in various positions of said sheet, the bending means embodying sheet edge portion engaging members disposed along at least one edge portion of said sheet.

2. A flexible glass body assembly comprising a flexible sheet of ion-exchange strengthened glass having a predetermined unstressed shape and two substantially parallel sheet edges, and sheet bending means embodying substantially oppositely disposed sheet edge portion engaging members spaced from one another to accommodate said sheet between them along said parallel sheet edges, said sheet of glass having sufficient elasticity to assume in cooperation with said sheet bending means a predetermined stressed shape forming a substantially uniform curve of parallel lines perpendicular to planes embodying said sheet edges while said sheet edges remain substantially parallel.

3. A flexible glass body assembly comprising a flexible sheet of ion-exchange strengthened glass fixedly mounted along one edge portion relative to a fixed axis and sheet bending means embodying sheet edge portion engaging members disposed along an edge portion of said sheet other than said one edge portion, said sheet of glass having sufficient elasticity to bend in cooperation with said bending means about said one edge portion.

4. A window assembly comprising a flexible pane of ion-exchange strengthened glass and pane support means embodying two substantially oppositely disposed pane edge portion engaging members spaced from one another to accommodate said pane between them, and form a path for said pane oblique to the member engaging edges thereof, said pane of glass having sufficient elasticity to conform to said path.

5. A window assembly comprising a flexible pane of ion-exchange strengthened glass, pane opening and closing means, and pane support means embodying one set of two substantially oppositely disposed pane edge portion engaging members spaced from one another to accommodate said pane between them in the open position and a second set of two substantially oppositely disposed pane edge portion engaging members spaced from one another to accommodate said pane between them in the closed position, each set of said members forming a path for said pane oblique to the member engaging edge of said pane, said pane of glass having sufficient elasticity to conform to each said path.

6. In a window assembly comprising a flexible pane of ion-exchange strengthened glass and pane bending means, a window leading edge assembly comprising a U-shaped member fixedly mounted to the leading edge portion of said pane and disposed for a slidable engagement with said pane bending means, the engaging surface of said member having a convex curvature.

7. The window assembly of claim 6 wherein said window leading edge assembly comprises a roller and roller mounting fixedly mounted to the leading edge portion of said pane and disposed for a rolling engagement with said pane bending means.

8. An automobile window assembly comprising a single solid flexible pane of ion-exchange strengthened glass having a predetermined unstressed shape and two substantially parallel pane edges, and pane support means embodying two substantially oppositely disposed pane edge portion engaging members spaced from one another to accommodate said pane between them along said parallel pane edges, said pane of glass having sufficient elasticity to bend in cooperation with said members to a stressed shape forming a substantially uniform curve having a radius of approximately 30 inches.

9. A flexible glass body assembly comprising glass sheet bending means embodied within said assembly and a flexible strengthened sheet of alkali metal silicate glass containing at least 5.0 percent by weight of a constituent selected from the group consisting of $Al_2O_3$ and $ZrO_2$, said sheet having a predetermined unstressed shape and sufficient elasticity to assume at least in part in cooperation with said sheet bending means predetermined configurations in various positions of said sheet, the bending means embodying sheet edge portion engaging members disposed along at least one edge portion of said sheet.

10. The flexible glass body assembly of claim 9 wherein said sheet of alkali metal silicate glass is selected from the group consisting of lithium silicate glass, alkali aluminosilicate glass, alkali-zirconia-silica glass, and alkali metal oxide glass.

11. The flexible glass body assembly of claim 10 wherein said sheet of glass is ion-exchange strengthened and has two substantially parallel sheet edges, said sheet bending means embodying substantially oppositely disposed sheet edge portion engaging members spaced from one another to accommodate said sheet between them along said parallel sheet edges.

12. The flexible glass body assembly of claim 11 which comprises an automobile window assembly.

* * * * *